Dec. 12, 1967   D. D. ROBERTS   3,357,272
APPARATUS FOR DELIVERING POWER
Filed Oct. 23, 1965   2 Sheets-Sheet 1

INVENTOR
D. DANA ROBERTS
BY
Roberts & Cohen
ATTORNEYS

United States Patent Office 3,357,272
Patented Dec. 12, 1967

3,357,272
APPARATUS FOR DELIVERING POWER
David Dana Roberts, 41—34 43rd St.,
Long Island City, N.Y. 11104
Filed Oct. 23, 1965, Ser. No. 503,376
23 Claims. (Cl. 74—710.5)

ABSTRACT OF THE DISCLOSURE

A differential transmission having a driven spider rotatably carrying a bevel gear in mesh with first and second gears which drive respective output shafts, the bevel gear being positively driven to vary the speeds of rotation of the output shafts.

---

This invention relates to apparatus for delivering divided power to a plurality of output shafts.

More particularly, the invention relates to apparatus which are operative with a differential-type gearing mechanism to positively drive the bevel gear thereof to control the speeds of the output shafts.

While it is known in the art to control the speeds of the output shafts of a differential gearing mechanism, the means employed is complex and indirect and is generally constituted by a complicated gear arrangement which is externally driven.

It is an object of the invention to provide a simple arrangement for driving the bevel gear of a differential gearing mechanism to control the speeds of the output shafts such that the complexity heretofore associated with the gear arrangements of the prior art is avoided.

It is another object of the invention to selectively drive in rotation the shaft on which the bevel gear is rotatably mounted in the normal differential gearing mechanism.

Yet another object of the invention is to drive the bevel gear of a differential gearing mechanism directly and from a location disposed within the mechanism.

Still another object of the invention is to drive the bevel gear from a central location within the differential-type gearing mechansm.

It is a feature of the invention to employ a driven ball chain for transferring driven power to the bevel gear.

Such ball chain can be driven by an electric motor, internal combustion engine, hydraulic motor, or the like.

Another feature of the invention is to drive the bevel gear in a known differential-type gearing mechanism by means of a suitable source of motive power which is disposed at a central location within the gearing mechanism, such that the source of motive power need not undergo revolvable movement.

In accordance with the invention, there is contemplated an improvement in an ordinary differential transmission of the type having a driven hollow body or spider, a bevel gear rotatably carried by said spider, and gears driven by said bevel gear for delivering power, said improvement comprising the provision of means in direct driving engagement with the bevel gear for driving the latter in rotation to modify the relative speeds of rotation of the gears which are driven by the bevel gear. Preferably, said means includes a driving element in driving engagement with the bevel gear and disposed within the spider for delivering a force to rotate the bevel gear from a point within the spider. In a preferred arrangement, the force is applied to the bevel gear from a central disposition within the spider, whereby components of revolvable movement are eliminated.

In further accordance with the invention, the bevel gear can be held in fixed position, whereby the speeds of rotation of the gears which are driven by the bevel gear are constrained to be equal.

It will be appreciated that the ability to modify the driven speed of the output or driven shafts of the differential-type gearing mechanism enable such mechanism to be used effectively in many different applications.

As a non-limiting example, may be mentioned the employment of the subject mechanism in vehicles for controlling the steering thereof. In a specific modification, the mechanism can be employed with large earth-working tractors in which each output shaft controls the track on a respective side of the tractor such that by modifying the speeds at which the output shafts are driven, the vehicle can be steered as desired.

In similar manner, the device can be utilized in twin-screw water craft for driving and steering the same.

The device may also be utilized as a non-slip differential mechanism wherein relative rotation of the output shafts driving the wheels is controlled in accordance with road conditions.

Further objects and advantages of the invention will become apparent from the following description taken in conjunction with the attached drawings wherein.

Figure 1:
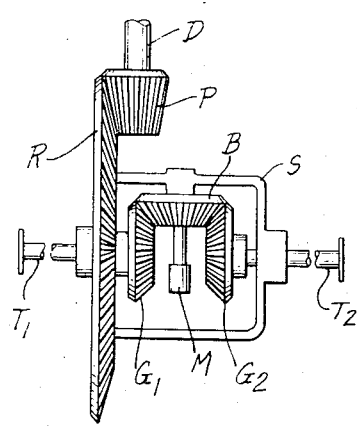
FIGURE 1 is a diagrammatic view of an embodiment according to the invention.

In FIG. 1 there is shown a differential-type mechanism which is driven by a pinion gear P mounted on a drive shaft D which is externally driven. The pinion drives a ring gear R which is integral with a spider S which is thereby driven together with ring gear R. Mounted within the spider S are gears G1 and G2 which are respectively coupled to output shafts T1 and T2 which are adapted for delivering power. The gears G1 and G2 are rotatably supported within the spinder, G1 being supported in a journal within ring gear R, while G2 is journalled directly in the spider S. A bevel gear B is supported for rotation within the spider S. When the bevel gear B acts as an idle gear, the rotation of the spider imparts equal output speeds to shafts T1, T2. During such operation, the bevel gear B is stationary. If the output speed of shaft T1 or T2 should change, due to the application of force thereto, bevel gear B will undergo rotation whereby one shaft will have a reduced speed and the other shaft an increased speed. Thus, the speed of output of the shafts can be expressed in relation to the speed of rotation of the spider plus or minus the speed for rotation of the bevel gear B, depending upon the direction of rotation thereof.

In accordance with the invention, the relative speeds of shafts T1 and T2 can be regulated therefor by driving the bevel gear B at a particular speed of rotation relative to the speed at which the spider S is driven. This is accomplished by the use of a suitable motive power means M which is directly coupled to the bevel gear B to drive the same in rotation with respect to the spider S. Such means may be an electric motor, a hydraulic motor or manually driven means. Moreover, the means M may be provided with a lock state such that the bevel gear is locked against rotation and the shafts T1 and T2 are constrained to rotate at equal speeds.

From the above it will be evident that the speed of rotation of shafts T1 and T2 can be readily controlled. Thus, if bevel gear B is locked against rotation, the shafts T1 and T2 will be driven at equal speeds which are equal to the speed of rotation of spider S. By driving the bevel gear B at a suitable speed of rotation, the speed of one of the shafts may be increased, while the other is reduced. In fact, one of the shafts can be rendered stationary, while the other is rotated at increased speed. Furthermore, by interrupting the drive of the shaft D and by rotating the bevel gear B, shafts T1 and T2 can be driven at equal speeds in opposite direction. This will have the effect of rotating the driven device about its own axis, as will be explained more fully hereinafter.

In summary, it is seen that the device shown in FIG. 1 may have the speed of the output shafts T1 and T2 regulated to any desired degree by controlling the speed of the input shaft D and the speed of rotation of the bevel gear B.

Figure 2:
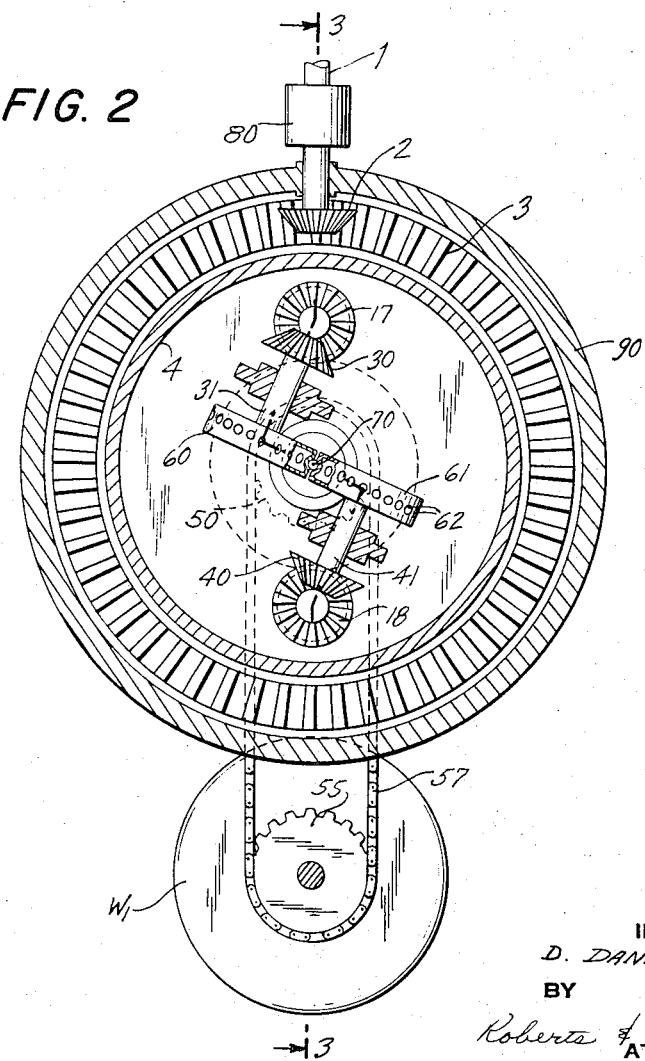
FIGURE 2 is a device according to the invention, shown for use with the drive wheels of a vehicle.
Figure 3:
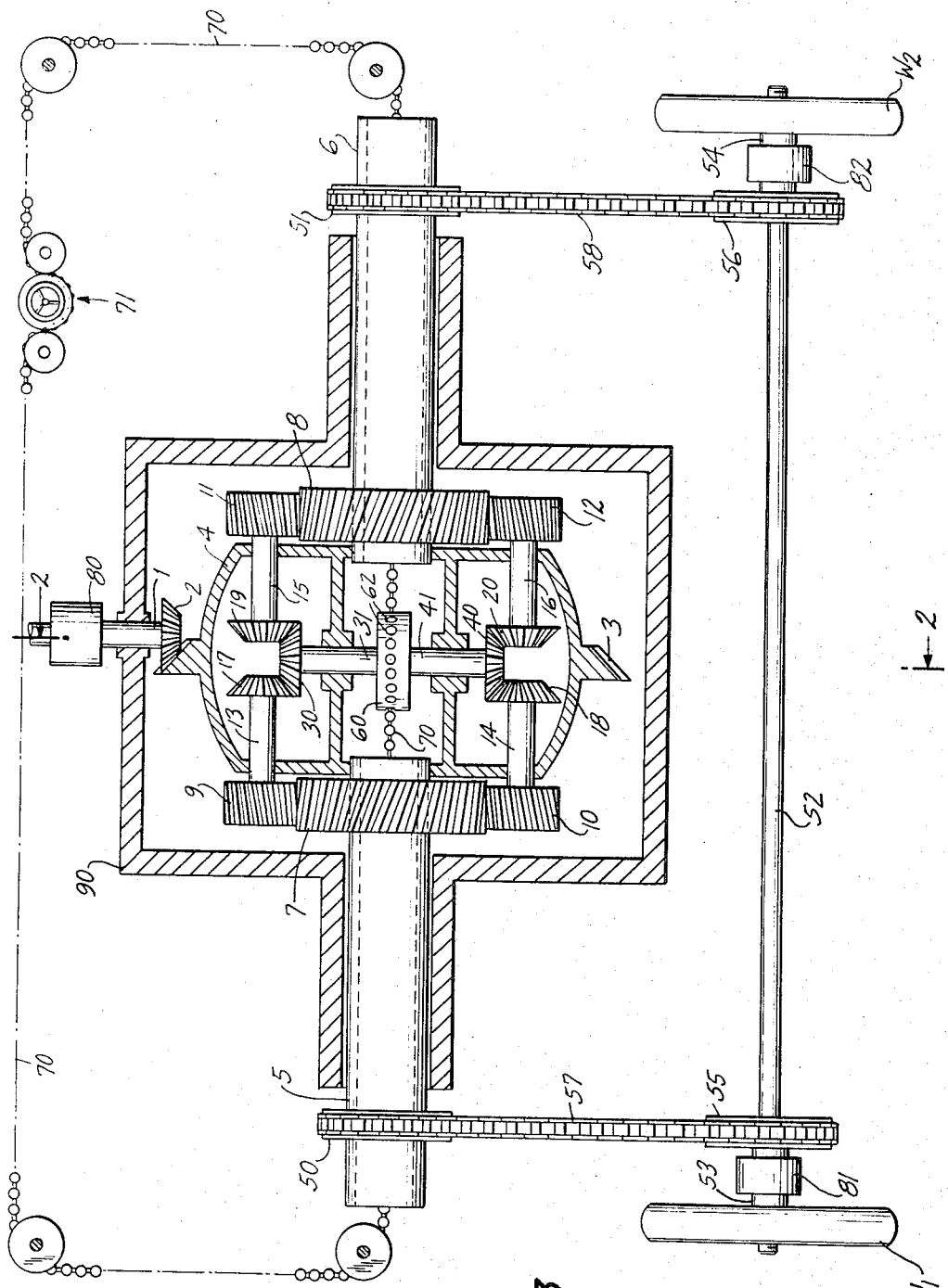
FIGURE 3 is a sectional view taken along lines 3—3 in FIG. 2.

The invention will next be described in greater detail in conjunction with the specific embodiment thereof, as shown in FIGS. 2 and 3, by way of example. The invention is not to be understood as being restricted to such example, which is solely offered for purposes of illustration.

In the embodiment shown in FIG. 2, which is directed to the drive of a vehicle having rear wheels W1 and W2, there is shown a mechanism for driving the wheels, which is comprised as follows:

A drive shaft 1 adapted for being externally driven, supports a pinion gear 2, which is in mesh with a ring gear 3 for driving the same. The ring gear is integral with a spider or hollow body 4, which is driven with the ring gear. Mounted within the body 4 for rotation are shafts 5 and 6, these shafts being supported in trunnions within the body 4. Gears 7 and 8 are directly coupled to the shafts 5 and 6 for rotation therewith. Gear 7 is in mesh with gears 9 and 10, while gear 8 is in mesh with gears 11 and 12. The gears 9, 10, 11 and 12 are supported on respective shafts 13, 14, 15, 17, which are individually supported in bearings in the spider 4 for relative rotation therewith. The shafts 13, 14, 15, 16 carry at their ends bevel gears 17, 18, 19 and 20. The bevel gears 17, 19 are in mesh with a bevel gear 30, while the bevel gears 18 and 20 are in mesh with a bevel gear 40. Bevel gear 30 is supported on shaft 31, which is rotatably mounted within the spider 4, while bevel gear 40 is mounted on shaft 41, which also is rotatably supported within the spider 4.

Mounted on shaft 5 is a sprocket wheel 50 and mounted on shaft 6 is a sprocket wheel 51. A single, one-piece axle 52 is provided, on which are journalled stub shafts 53 and 54. Integral with these stub shafts are sprocket wheels 55, 56 and chains 57 and 58 coupled to sprocket wheels 50 and 55; and 51 and 56 respectively. Thus, the stub shafts 53, 54 are driven independently from their respective shafts 5 and 6, via the sprocket wheels and chains. The wheels W1 and W2 are driven with the stub shafts 53 and 54 respectively.

In the device already described, there will generally be caused equal rotation of wheels W1 and W2, assuming equal resistance thereof as a consequence of the drive of input shaft 1 which is transmitted through ring gear 3, spider 4, shafts 5 and 6 and the chains and sprocket wheels. In this situation, the bevel gears 30 and 40 remain stationary.

In order to modify the speed at which the wheels are driven, for the purpose for example of steering the vehicle, the following structure is provided:

Drums 60 and 61 are respectively coupled to shafts 31 and 41 for rotation therewith. The drums lie in a common plane and have a series of cavities 62, provided in the surfaces thereof. A chain 70 passes between the surfaces of the drums and is engaged in the cavities 62 thereof, such that longitudinal advancement of the chain causes the drums to rotate in opposite direction. The shafts 5, 6 are hollow and the chain 70 passes therethrough. The chain advances along a closed path and is thereby endless and is supported by a number of idle wheels. The chain is constructed as a ball chain which is composed of a series of spherical balls which are interconnected by pins. The cavities 62 in each drum are hemispherical and the drums are relatively angularly oriented so that the cavities thereof are aligned and cooperatively form spherical cavities in which the balls of the chain are rotatably receivable. The balls of the chain become partially accommodated in the cavities 62 of the respective drums (FIG. 3) so that as the chain is advanced, the drums are caused to rotate in opposite directions. Of course, reverse movement of the chain will cause respectively reverse directions of rotation of the drums.

The chain passes along a path which is in the center of the spider and extends along the axis about which the spider is driven in rotation. The spherical shape of the balls of the chain and the corresponding spherical shape defined by the cavities 62 of the drums enables universal movement of the surrounding drums and spider with respect to the chain, whereby free rotation of the spider will not be affected by the presence of the chain.

While the chain has been illustrated in the form of spherical balls with interconnected pins, it may have other shapes and yet accomplish its intended function. In this regard, the chain can be composed of interconnected links each of which carries a respective ball. Alternatively, the balls can be replaced with annular bodies such as cylinders which are disposed with their axes coincident with the axis of rotation of the spider when they pass between the drums.

In order to drive the chain there is provided at one location along the path of the chain a motive power means which for purposes of simplification has been shown as a manual device 71. By turning the manual device 71, the chain is advanced along its path in one direction or the other, so as to drive the drums 60, 61 and the bevel gears 30 and 40 therewith. This causes the gears 7 and 8 to rotate in opposite direction through the intermediary of gears 9–12 and gears 17–20. As a result of the rotation of gears 7 and 8, the shafts 5 and 6 are driven in concurrence therewith and thereby the wheels W1 and W2 are similarly driven. The overall speed of rotation of wheels W1 and W2 is therefore dependent upon the speed at which the input shaft 1 is driven and at the speed at which the ball chain 70 is driven. Since these can be controlled by the operator of the vehicle, it is therefore possible to easily and accurately control the speeds of the wheels W1 and W2, whereby a steering operation can be readily accomplished.

As a feature of operation, the motive power means, i.e., the manual device 71, can be held so as to prevent travel of the chain 70. Thereby the bevel gears 30 and 40 will be fixed against rotation and consequently the drive shafts 5 and 6 will be driven at equal speeds of rotation by the drive of the input shaft 1. Accordingly, the wheels W1 and W2 will be driven at equal speeds. By releasing the manual device 71, and allowing the chain to be advanced freely along its path, the mechanism will operate as a normal differential mechanism and any differences in speed of rotation of wheels W1 and W2 will be accommodated by rotation of bevel gears 30 and 40, which is now able to be accomplished by the free passage of ball chain 70 as occasioned by the rotation of drums 60, 61.

It is important to reemphasize that the drums 60, 61 are disposed at a central position within the spider 4 and engage the chain 70 such that the latter extends axially through the spider and undergoes no rotation. Moreover, the central disposition of the chain 70 and the drums 60, 61 insures symmetrical application of force to the bevel gears 30, 40, and therefore eliminates the generation of eccentric forces which are frequent causes of wear and damage to the mechanism.

Mounted on the input shaft 1 is a brake device 80, while mounted on the stub shafts 53 and 54 are brake devices 81 and 82. These brake devices 80, 81 and 82 are of conventional construction and are controlled by the operator in conventional manner, such as by foot pedals or hand controls as desired.

By applying the brake device 80 to hold shaft 1 stationary, the shafts 5 and 6 and the wheels W1 and W2 thereby will be driven at equal speeds and in opposite direction, upon the driving of chain 70. As a consequence thereof, the device will be caused to rotate about its own axis, i.e., while remaining in a stationary position. The brake devices 81 and 82 are intended for operation with the manual device 71, for the purpose of familiarizing an unskilled operator with the degree of turning which can be obtained with the device 71, by observance of the number of rotations of the manual device 71 when the brake is applied to one wheel and the vehicle steered thereby. Once the operator has a "feel" for the steering of the device, using the manual device 71, there is no need for the use of the braking devices 81 and 82, and generally a disconnect means is provided for their disconnection.

A stationary housing 90 completely surrounds all of the gears and rotatably supports the shafts. The housing insures protection of the gears against external dirt and the like, while also maintaining suitable lubrication of the gears by retention of lubricants. For this purpose, the housing 90 may be in sealed engagement with the shafts 5 and 6, to prevent leakage of lubricants. A conventional filling and draining opening in the housing 90 may be provided.

From the above it should be apparent that applicant has provided a device in which the relative speed of rotation of the wheels W1 and W2 can be controlled by controlling or regulating the speeds at which the shafts 31 and 41 are driven by the chain 70 through the drums 60, 61. The wheels W1 and W2, instead of resting directly on the ground, may in turn drive the tracks on opposite sides of the tractor. This will enable such tractor to be steered as desired, eliminating the need for separate drives from separate motors to the respective tracks.

Numerous modifications and variations of the disclosed embodiments and methods will become apparent to those skilled in the art without departing from the scope and spirit of the invention.

For example, the chain drive and drums can be readily replaced with any suitable source of motive power such as a hydraulic motor or electric motor which is centrally mounted within the spider 4, so as to drive the shafts 31 and 41 in opposite directions when activated. Similarly, in the case where a chain is used, any suitable source of motive power may be employed in replacement of manual device 71.

What is claimed is:

1. In a differential transmission adapted for driving first and second output shafts and having a driven spider, a bevel gear rotatably carried by said spider and first and second gears in mesh with said bevel gear and coupled to respective output shafts, said first and second gears being operatively driven by said spider via said bevel gear for driving the output shafts, an improvement comprising an independent drive means in direct driving engagement with the bevel gear for positively driving the latter in rotation at controlled speeds to vary speeds of rotation of the first and second gears and thereby modify the speeds of the output shafts which are driven by the bevel gear.

2. In a transmission as claimed in claim 1, wherein said means includes a driving element in driving engagement with the bevel gear and disposed within the spider for delivering a force to rotate the bevel gear from a point within the spider.

3. In a transmission as claimed in claim 2, wherein said driving element is rigid with said bevel gear and disposed within the spider, said means further including a driven member in engagement with said driving element to drive the same and bevel gear therewith.

4. In a transmisssion as claimed in claim 3, wherein said driven member is an endless chain.

5. In a transmission as claimed in claim 4, wherein said transmission comprises hollow drive shafts rigidly coupled to said gears which are driven by the bevel gear, said chain passing through said shafts.

6. In a transmission as claimed in claim 3, wherein said means further comprises a source of motive power coupled to the driven member to drive the same and the bevel gear thereby.

7. In a transmission as claimed in claim 6, wherein said source is disposed outside the spider.

8. In a transmission as claimed in claim 6, wherein said source is disposed inside the spider.

9. In a transmission as claimed in claim 6, wherein said transmission is provided with a second bevel gear in the spider symmetrically disposed with respect to the first bevel gear and in driving engagement with the gears which deliver power, said means comprising a second driving element rigid with said second bevel gear, said driven member engaging said first and second driving elements to rotate the same simultaneously.

10. In a transmission as claimed in claim 1, wherein said means includes locking means for locking said bevel gear.

11. In a transmission adapted for driving at least two shafts at controlled speeds, said transmission comprising a driven spider, a bevel gear rotatably supported in said spider, first and second gears rotatably supported by said spider, means in mesh with said bevel gear and with said first and second gears for driving said first and second gears from said spider at equal speeds in the same direction with the bevel gear non-rotating, and for varying said speeds by equal magnitude in opposite directions upon rotation of the bevel gear, first and second shafts coupled to respective of said first and second gears for rotating therewith and means for directly and positively driving the bevel gear from within the spider to drive in turn the first and second gears in opposite directions whereby the speed of said shafts can be varied as desired.

12. A transmission as claimed in claim 11, wherein said means for driving the bevel gear has an inactive state in which the bevel gear is free for rotation.

13. A transmission as claimed in claim 11, wherein said means for driving the bevel gear has a locked state in which the bevel gear is locked against rotation and the shafts are constrained to rotate at equal speeds.

14. Apparatus for delivering power comprising a hollow body adapted for being driven in rotation, first and second shafts rotatably supported in said body, gear means supported from said body and engaging said shafts for rotating said shafts from said body at equal speeds in the same direction, a further gear in mesh with said gear means, said further gear being supported from said body for rotation and being in mesh with said gear means such that upon rotation of the further gear the first and second shafts are driven in respectively opposite directions of rotation, and means directly engaging the further gear from within said body to drive the further gear in rotation and control the relative speeds of rotation of the shafts.

15. Apparatus for delivering power comprising a hollow body adapted for being driven in rotation, first and second output shafts, means supporting said output shafts for rotation in said body, gear means coupled to the shafts and to the body for rotating the shafts at the same speed in the same direction by the rotation of the body, a further gear, means supporting the further gear in the body for rotation, said further gear being in mesh with said gear means such that upon rotation of the further gear the first and second output shafts are driven in respectively opposite directions of rotation, and means directly engaging the means which supports the further gear for driving the latter in rotation to control the relative speeds of rotation of the shafts.

16. Apparatus for delivering power comprising a hollow body adapted for being driven in rotation, a pair of gears rotatably supported by said body for delivering power, a further gear, means supporting the further gear in said body for rotation, said further gear being in mesh with said pair of gears such that with the further gear non-rotating, the gears of said pair are driven in the same direction of rotation whereas upon rotation of the further gear the gears of said pair are additionally driven in respectively opposite directions of rotation, and means engaging the means which supports the further gear for driving said further gear in rotation to control the speeds of rotation of the gears of said pair.

17. Apparatus for delivering power comprising first and second power delivering means, a rotatable body supporting said power delivering means for driving the same in rotation at equal speeds upon rotation of said body, idle means between and coupling said first and second power delivering means together, means supporting the latter idle means from said body for rotation, and means engaging the latter means to drive the same and the idle means therewith in rotation such that the speed of said first and second power delivering means are respectively increased and decreased in equal amounts.

18. Apparatus for delivering power comprising first and second power delivering means, means for driving said first and second means with substantially equal outputs, idle means between and coupling said first and second power delivering means together for permitting differences of output of said power delivering means, and means for directly driving said idle means to vary simultaneously the outputs of said first and second power delivering means.

19. In a transmission as claimed in claim 1 wherein one of said output shafts is hollow and said drive means includes means passing through the hollow shaft for imparting drive to the bevel gear.

20. A transmission as claimed in claim 11 wherein at least one of said shafts is hollow and the transmission further comprises means passing through each hollow shaft and engaging the means which drives the bevel gear for activating the latter means.

21. A transmission as claimed in claim 14 wherein at least one of said shafts is hollow and the transmission further comprises means passing through each hollow shaft and engaging the means which drives the further gear for activating the latter means.

22. Apparatus as claimed in claim 15 wherein one of said output shafts is hollow and the means for driving the means which supports the further gear comprises means passing through the hollow shaft for imparting drive to the further gear.

23. Apparatus as claimed in claim 16 wherein one of said output shafts is hollow and the means for driving the means which supports the further gear comprises means passing through the hollow shaft for imparting drive to the further gear.

References Cited

UNITED STATES PATENTS

| | | | |
|---|---|---|---|
| 1,401,204 | 12/1921 | Storex | 74—710.5 |
| 1,679,610 | 8/1928 | Knox | 74—710.5 |
| 3,081,647 | 3/1963 | Blenkle | 74—710.5 |
| 3,107,763 | 10/1963 | Hill. | |
| 3,142,203 | 7/1964 | Bamford | 74—710.5 |
| 3,215,000 | 11/1965 | Senkowski et al. | 74—710.5 |
| 3,220,284 | 11/1965 | Horvath | 74—710 X |

DONLEY J. STOCKING, *Primary Examiner.*

LEONARD H. GERIN, *Assistant Examiner.*